June 19, 1923.
G. L. NORRIS
CENTERING AND CLAMPING MEANS FOR SAWS AND OTHER ARTICLES
Filed Sept. 14, 1922
1,459,683
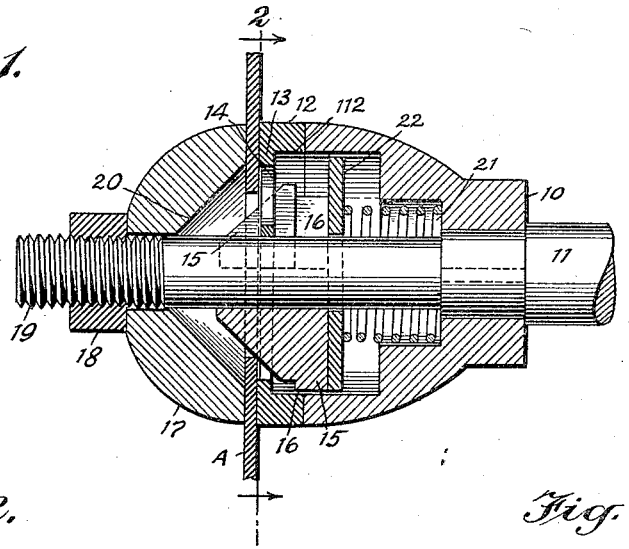
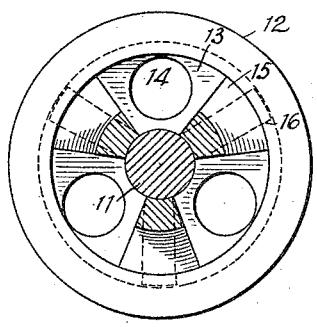
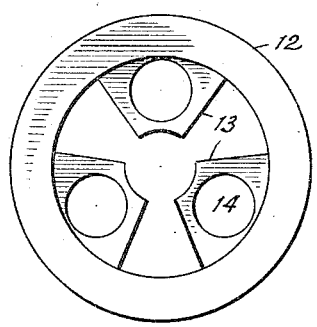
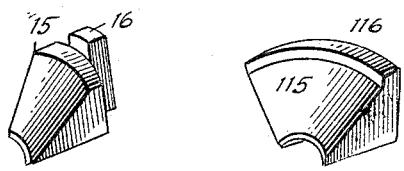
WITNESSES
INVENTOR
George L. Norris
BY
ATTORNEYS Patented June 19, 1923.

1,459,683

UNITED STATES PATENT OFFICE.

GEORGE L. NORRIS, OF WILMINGTON, DELAWARE.

CENTERING AND CLAMPING MEANS FOR SAWS AND OTHER ARTICLES.

Application filed September 14, 1922. Serial No. 583,225.

*To all whom it may concern:*

Be it known that I, GEORGE L. NORRIS, a citizen of the United States, and a resident of Wilmington, in the county of New Castle and State of Delaware, have invented a new and Improved Centering and Clamping Means for Saws and Other Articles, of which the following is a description.

My invention relates to arbors for saws, emery wheels or the like and particularly to a means for centering the saw or wheel on the arbor and clamping the same firmly in position.

The general object of my invention is to provide a novel centering and clamping means improved in various particulars, whereby to promote simplicity of assemblage to provide a secure fastening, and to provide an assemblage characterized by the facility with which the saw or the like may be clamped or released.

Reference is to be had to the accompanying drawings forming a part of this specification, it being understood that the drawings are merely illustrative of practical examples of the invention.

Figure 1 is a longitudinal section of a portion of an arbor equipped with my invention, the view including a fragment of a saw centered and clamped;

Figure 2 is a transverse section as indicated by the line 2—2, Figure 1;

Figure 3 is a front view of a ring entering into the device;

Figure 4 is a perspective view of one of the bush elements employed in association with the ring shown in Figure 3;

Figure 5 is a perspective view of a modified bush that may be employed.

In carrying out my invention in accordance with the illustrated example a head 10 is provided having a bore to fit the arbor 11. Adjacent the head 10 at the face thereof is a clamping ring 12 to engage a saw or the like, indicated at A, at one side. Said ring in one form of my invention has spaced webs 13 which may have holes 14 for lightness of construction. The head 10 and ring 12 are chambered. Within the chamber I provide an annular series of bush members 15 tapered at the front and each arranged between adjacent pairs of webs to be guided. The members may be formed as shown in Figure 4 with an oblong protuberance 16 at the back and projecting beyond the outer edge of the bush member to engage behind the ring 12 as indicated in dotted lines in Figure 2.

The bush means may be formed as shown in Figure 5 in which the bush is designated by the numeral 115 and shown as provided with an arcuate flange 116 to which the conical surface extends, said flange being adapted to engage behind the ring 12, that is to say, to extend within the annular chamber 112 of said ring.

The bush in Figure 5 is shown larger than the one in Figure 4 and the three bush members in practice may have such a size as to form substantially a complete cone to lie alongside one another without being separated by webs 13, it being understood that a plain chambered or angular ring is employed with the member shown in Figure 5.

A clamp collar 17 fits the arbor 11 so that the saw A or wheel to be clamped will be disposed on the arbor between said collar 17 and the ring 12. A nut 18 engages the threaded portion 19 of the arbor to bear against the collar 17 and firmly tighten up on the same to cause it to bear against the saw A.

The collar 17 has a conical chamber 20 to partially receive the tapered ends of the bushes 15 or 115. A coil spring 21 is provided on the arbor within the chamber of the head 10 and bears at one end against a washer 22.

With the above described construction the head 10 with washer 22 and spring 21 is placed on the arbor as well as the ring 12 and the bushes 15 or 115. The saw A for example is now placed on the arbor against the ring 12 so that the tapered ends of the bushes protrude through the bore or eye of the saw, the taper of the bushes serving to center or equalize the saw on the arbor. The collar 17 and nut 18 are now placed on the arbor and said nut turned up to cause the centered saw A to be firmly clamped between the ring 12 and the collar 17.

I would state in conclusion that while the illustrated examples constitute practical embodiments of my invention I do not limit myself strictly to the exact details herein illustrated, since, manifestly, the same can be considerably varied without departure from the spirit of the invention as defined in the appended claims.

Having thus described my invention, I claim:

1. An assemblage of the class described including a chamber ring presenting an annular shoulder disposed toward the head and spaced webs extending toward the center of the ring, a plurality of tapered bush members within said head and guided between said web members and said ring, said members being tapered to center a saw wheel, and provided with members projecting therefrom at the periphery adapted to be accommodated in the chamber of the ring, a collar fitted on the arbor coaxial with the head, said collar and said ring adapted to clamp a saw or wheel therebetween, and means on the arbor engaging said collar adapted to cause a clamping axis thereon.

2. In a device of the class described, a head adapted to fit an arbor, said head being formed with a chamber, a ring having a plurality of spaced webs projecting from its periphery towards its center loosely arranged on said arbor adjacent the forward end of said head, a plurality of bush members around said arbor between said webs, said members being tapered, a washer behind said members, a spring between said washer and the rear wall of the chamber in said head, and means also on said arbor forwardly of said ring and the article to be centered by said members for clamping said article in place.

GEORGE L. NORRIS.